United States Patent

Seidel

[15] 3,682,304
[45] Aug. 8, 1972

[54] SLUICE ASSEMBLY
[72] Inventor: Emil L. Seidel, 3150 East Prince, Tucson, Ariz. 85716
[22] Filed: Jan. 20, 1970
[21] Appl. No.: 4,266

[52] U.S. Cl. .................... 209/443, 209/504, 209/508
[51] Int. Cl. .............................................. B03b 3/12
[58] Field of Search...... 209/443, 504, 332, 435, 436, 209/437, 441, 471, 472, 479, 480

[56] References Cited

UNITED STATES PATENTS 2,944,668  7/1960  Stephan..................... 209/443
1,964,716  7/1934  Ater......................... 209/504 X Primary Examiner—Frank W. Lutter
Assistant Examiner—Ralph J. Hill
Attorney—Clarence A. O'Brien and Harvey B. Jacobson

[57] ABSTRACT

An inclined sluice pan is supported at its lower end by a crank suspended from an vertically adjustable axis. The other end is reciprocated horizontally along the longitudinal axis of the pan, whereby the total reciprocatory movement of the pan has at least two components, one component along the horizontal and one component which varies from a minimum to a maximum between the ends of the pan of an angular nature around the lower suspension support.

8 Claims, 6 Drawing Figures

PATENTED AUG 8 1972

Emil L. Seidel
INVENTOR.

BY Clarence A. O'Brien
and Harvey B. Jacobson
Attorneys

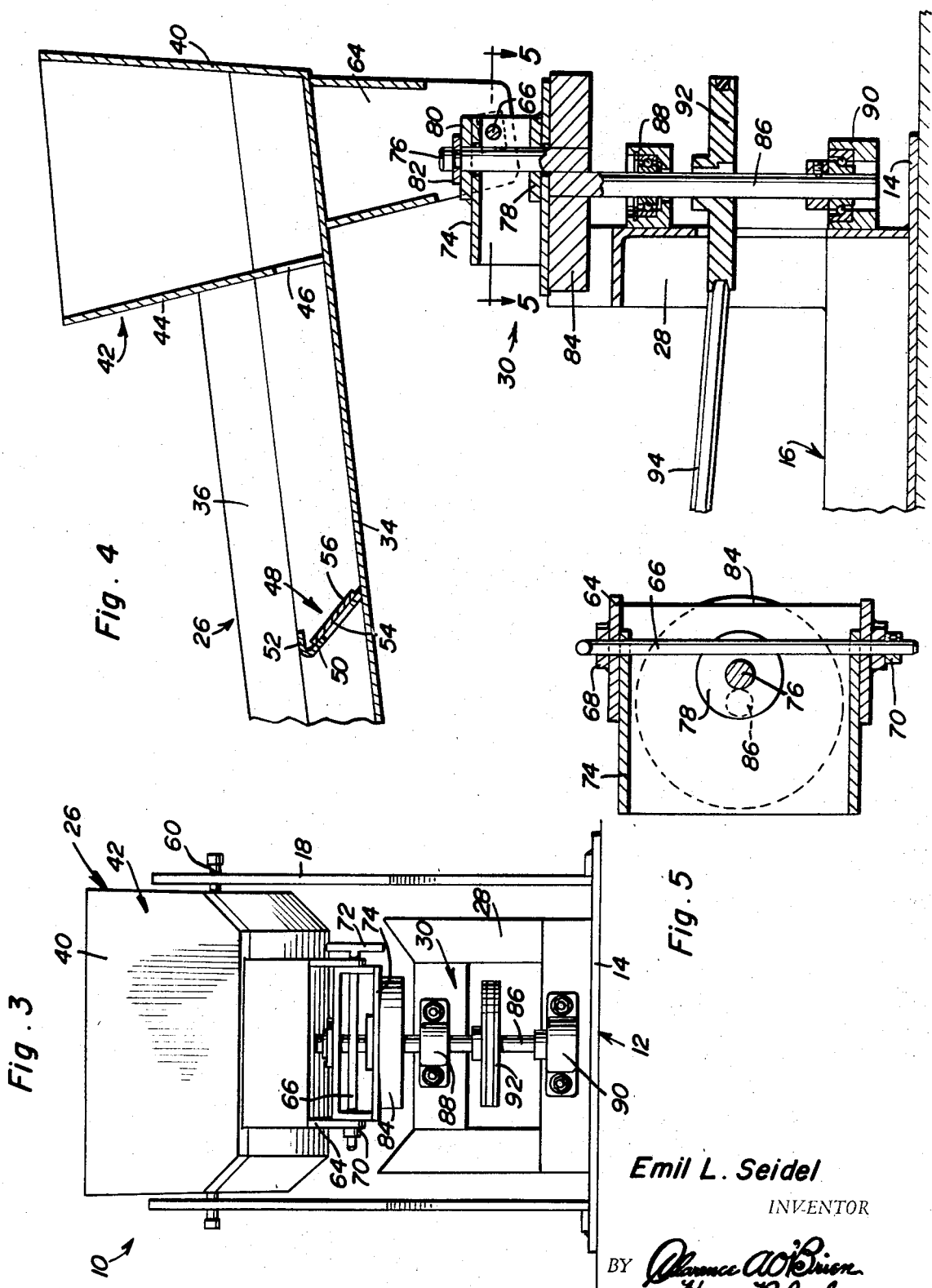

SLUICE ASSEMBLY

This invention relates to the recovery of mineral matter such as free gold from water by mechanical separating means.

Mechanical apparatus for recovering mineral matter such as gold from natural flowing water, is well known. In this type of apparatus, the water containing the mineral matter is introduced into an elongated pan or trough having riffles therein. Controlled movement is imparted to the pan causing the water to be displaced over the riffles to progressively leave behind the mineral matter. Various vibratory types of movements have been imparted to sluice pans for this purpose taking advantage of the differences in relative density of the medium conducted through the sluice pan in order to retain the desired mineral matter.

Generally, in apparatus of the aforementioned type the sluice pan is pivotally or otherwise movably mounted in an inclined position on a frame so that a vibratory movement may be imparted thereto. This vibratory motion has been uniformly distributed to all portions of the pan. While such apparatus has been successful to some degree in recovering desired mineral matter, recovery has not been as efficient as possible. Further, such apparatus become progressively less efficient in recovery as matter accumulates or is packed along the riffles thereby permitting desired values or mineral matter to escape. It is therefore an important object of the present invention to provide a gold recovery apparatus which avoids the aforementioned drawbacks of prior apparatus.

In accordance with the present invention, the vibratory motion imparted to the sluice pan varies in amplitude between the downstream end portion of the sluice pan at which it is pivotally suspended and an upstream end portion at which a powered drive mechanism imparts the vibratory motion to the sluice pan. Thus, desired mineral matter or values of different sizes are trapped by the riffles in the sluice pan corresponding to the variation in vibratory amplitude at each of the riffles. The vibratory motion includes a translatory component of relatively constant amplitude along the entire pan for maintaining a minimum amount of flow over the riffles while the oscillatory components of motion at different points increase in amplitude from adjacent the downstream end to the upstream end in order to permit trapping of different size values behind each riffle. Vertical adjustment of the pivotal suspension of the pan changes both its inclination and the resultant oscillatory movement relative to the frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an end view of the apparatus shown in FIGS. 1 and 2.

FIG. 4 is an enlarged partial sectional view taken substantially through a plane indicated by section line 4—4 in FIG. 2.

FIG. 5 is a sectional view taken substantially through a plane indicated by section line 5—5 in FIG. 4.

Figure 1:
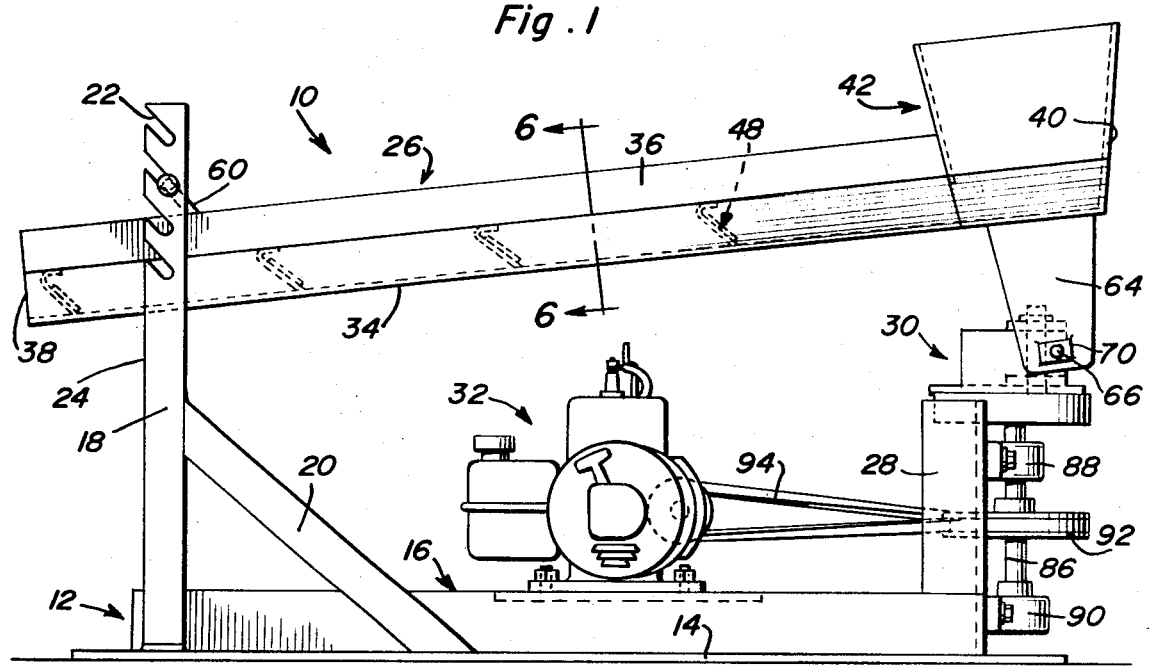
FIG. 1 is a side elevational view of the apparatus of the present invention.
Figure 2:
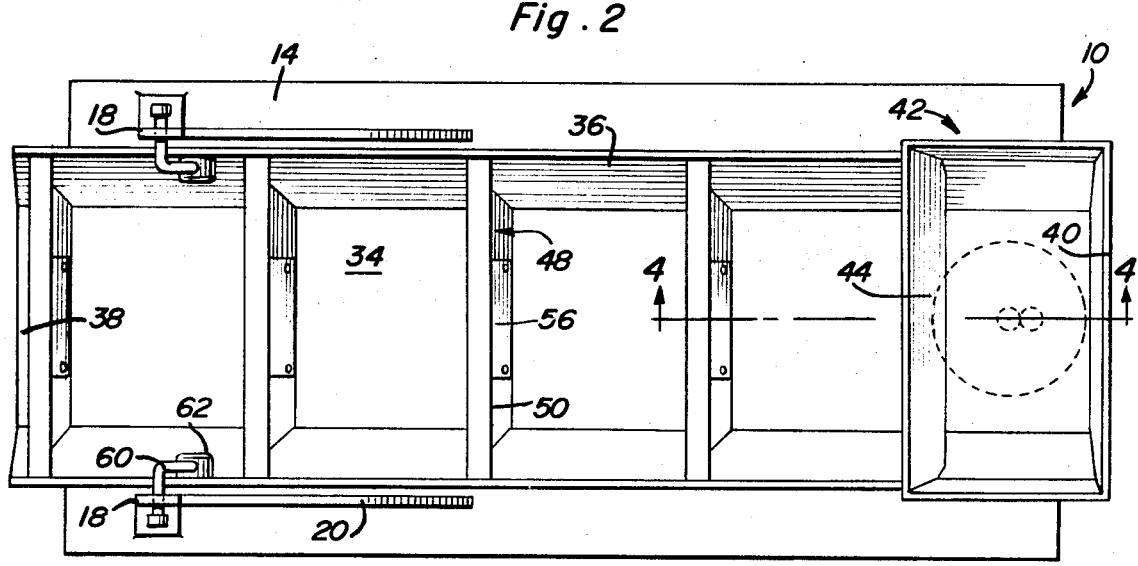
FIG. 2 is a top plan view of the apparatus shown in FIG. 1.

Referring now to the drawings in detail, FIGS. 1, 2 and 3 illustrate a sluice pan type of recovery apparatus generally referred to by reference numeral 10. The apparatus includes a frame generally denoted by reference numeral 12 which includes a base plate 14 on which a support structure 16 is mounted. A pair of posts or bars 18 are secured to the base plate 14 adjacent one end of the motor supporting structure. The posts are firmly supported in perpendicular relation to the base plate by braces 20 and are provided with a plurality of vertically spaced slots 22. The slots open at the rear edges 24 of the posts and are inclined downwardly therefrom as shown in FIG. 1 to form part of a pivotal support for an elongated sluice pan generally referred to by reference numeral 26. The frame 12 furthermore includes a pair of interconnected support elements 28 mounting a positive drive mechanism generally referred to by reference numeral 30 at one end of the support structure 16 in spaced relation to a power plant 32 through which the drive mechanism is powered for imparting vibratory motion to the pan assembly 26.

The pan assembly is supported in an inclined position on the frame and includes a bottom 34 to which longitudinal side walls 36 are connected diverging upwardly from the bottom wall. The downstream end 38 of the pan is opened while the upstream end is closed by the end wall 40 of an open topped hopper 24 that projects upwardly from the side walls of the pan. The hopper includes a front wall 44 having an inlet opening 46 as more clearly seen in FIG. 4. Thus, water is introduced at the upstream end of the pan through the hopper 42 for flow downwardly through the pan.

Figure 6:
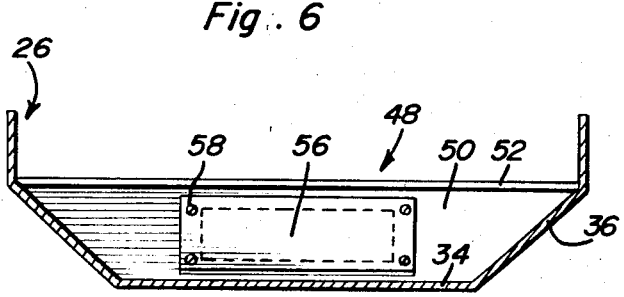
FIG. 6 is an enlarged partial transverse sectional view taken substantially through a plane indicated by section line 6—6 in FIG. 1.

Mounted in longitudinally spaced relation within the pan, are a plurality of riffles 48 which impede the free flow of water downwardly through the pan between the side walls 36. Each of these riffles includes a plate 50 secured as by welding to the bottom 38 of the pan and extending laterally between the side walls 36. Further, the plate 50 is inclined forwardly in a downstream direction and is provided at its upper end with a rearwardly extending flange 52 by means of which material may be trapped on the upstream side of the riffle. Each riffle is formed with an opening 54 that is closed by a cover 56 removably attached to the plate 50 by a plurality of fasteners 58 as more clearly seen in FIG. 6. By removing the covers 56, the sluice pan may be flushed with water for cleaning purposes.

As more clearly seen in FIGS. 1 and 2, a pair of crank elements 60 are pivotally connected to the side walls 36 of the pan on the inside through pivot elements 62 located adjacent the downstream end 38 of the pan. The crank elements extend upwardly above the side walls and laterally outwardly for slidable reception within selected slots 22 on the posts 18. Thus, the pan may be pivotally suspended between the posts 18 at a vertically adjusted position in order to determine the inclination of the pan. At the upstream end of the pan below the hopper 42, a pair of interconnected arms 64 extend downwardly from the bottom 34 of the pan. A pivot rod 66 extends horizontally between the arms 64 through bearing formations 68 located adjacent the lower ends of the arms in order to establish a horizontal pivotal connecting axis at which the drive mechanism 30 is connected to the pan for imparting vibratory motion thereto.

Referring now to FIGS. 4 and 5, the pivot rod 66 is held assembled by means of a collar 70 secured to the rod by a setscrew in axially abutting relation to one of the bearing formations 68, the other end of the rod having a T-formation 72 as shown in FIG. 3. The rod pivotally connects the arms 64 to a connecting link member 74 through which a vertical crankpin 76 extends. Spaced bearing discs 78 and 80 are secured as by welding to the connecting link member and journal the crankpin while a thrust washer 82 locked to the upper end portion of the crankpin through a groove, abuts the bearing disc 80 to hold the connecting link member assembled on a rotor 84 to which the crankpin 76 is connected. The rotor is connected to the upper end of a power shaft 86 which is rotatably mounted by an upper bearing assembly 88 and a lower thrust bearing assembly 90 secured to the supports 28 and 16 respectively. The bearing assemblies 88 and 90 establish a vertical rotational axis for the rotor 84 which is in parallel spaced relation to the axis of the crankpin 76. Rotation of the power shaft 86 will therefore impart rotation to the pivotal connecting pin 66 to which the crankpin 76 is connected in a rotational plane perpendicular to the rotational axis of the power shaft 86. The power shaft 86 is rotated by means of a driven pulley wheel 92 secured to the power shaft between the upper and lower bearing assemblies. An endless drive belt 94 is entrained about the pulley wheel 92 and about the drive pulley associated with the power plant 32. The power plant may be in the form of an internal combustion engine having a reduction gear box drivingly connecting the engine shaft to the drive pulley.

It will be apparent from the foregoing description, that the drive mechanism 30 will impart movement to the pin 66 in a horizontal rotational plane so as to reciprocate the pan in the horizontal direction of flow through a stroke dependent upon the radial distance between the pin 66 and the axis of the power shaft 86. As a result of this reciprocatory stroke of the pin 66 in the horizontal direction of flow, a cyclically reversing translatory type of movement is imparted to the pan constituting a rocking motion about the adjustably fixed horizontal axis established through the laterally extending portions of the crank elements 60 from which the pan is pivotally suspended by the posts 18 adjacent the downstream end thereof. Thus, this translatory movement will induce flow of water longitudinally along the pan. Translatory movement refers to the motion of a body (pan 26 in this case) with all points on the body at any instant have the same velocity or movement in the same direction at the same rate, in contrast to or distinct from rotation or angular motion of the body about a fixed axis. Oscillatory movement, on the other hand, refers to the cyclically reversing angular motion of the body relative to a fixed center of rotation.

In addition to the translatory movement imparted to the pan by the drive mechanism 30, other motion components are imparted of an oscillatory nature. Oscillatory movement in a vertical plane relative to the axis through pivot elements 62, is imparted at the upstream end of the pan where the stroke or amplitude of such vertical oscillatory movement is maximum. By adjusting the vertical position of the crank element 60, the amplitude of the oscillatory stroke may be changed as an inverse function of the angle of inclination since the crank elements 60 are located vertically above the pin 66. The resultant oscillatory motion of the pan relative to the frame may thus be varied at the same time that the pan inclination is changed by vertically adjusting the position of crank elements 60 on the post 18. Also, rotation of the power shaft 86 imparts a lateral displacement to the pin 66 producing lateral vibration of the pan relative to its support adjacent the downstream end by the crank element 60. The amplitude of this lateral vibration will be constant. While the translatory motion of all points on the pan does not vary in stroke from one end to the other, the oscillatory movement of all points relative to pivots 62 does vary in stroke from a maximum at the upstream end to the minimum adjacent the downstream end of the pan. In view thereof, larger particles of mineral matter will be trapped by the riffles 48 closer to the upstream end whereas finer particles or values will be collected closer to the downstream end where the oscillatory motion is of a smaller degree.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an elongated sluice pan supported on a frame in an inclined position with a plurality of riffles mounted therein longitudinally spaced between upstream and downstream ends of the pan for restricting flow of material introduced at the upstream end, pivotal suspension means pivotally suspending the pan adjacent the downstream end from an oscillation axis fixed to the frame, and positive drive means connected to the pan adjacent the upstream end for imparting translatory movement to the pan relative to the frame and oscillatory movement relative to the oscillation axis.

2. The combination of claim 1 wherein said pivotal suspension means includes a crank element connected to the pan, and a post extending from the frame on which the crank element is pivotally displaceable about said oscillation axis.

3. The combination of claim 2 wherein said post is provided with a plurality of vertically spaced slots slidably receiving the crank element in vertically adjusted positions of the oscillation axis relative to the drive means to simultaneously vary the inclination of the pan and movement thereof relative to said fixed axis.

4. The combination of claim 3 wherein said drive means includes power operated means rotatable about a rotational axis fixed to the frame, a crankpin mounted by the power operated means in radially spaced relation to the rotational axis, and means pivotally connecting the crankpin to the pan for displacing the pan at said upstream end in a rotational plane perpendicular to said rotational axis.

5. The combination of claim 1 wherein said pivotal suspension means includes a crank element connected to the pan, and a post extending from the frame on which the crank element is pivotally displaceable about said oscillation axis.

6. The combination of claim 1 wherein said drive means includes power operated means rotatable about a rotational axis fixed to the frames, a crankpin mounted by the power operated means in radially spaced relation to the vertical axis, and means pivotally connecting the crankpin to the pan for displacing the pan at said upstream end in a rotational plane perpendicular to said rotational axis.

7. In combination with an elongated sluice pan, a frame, a crank pivotally connected to the pan adjacent one end, drive means mounted on the frame and connected to the pan adjacent the other end for imparting cyclically reversing horizontal movement to the pan along its longitudinal axis, and means suspending the crank from a pivotal axis fixed on the frame above the drive means for supporting the pan at an inclination and constraining movement thereof by the drive means, whereby cyclically reversing movement is obtained in at least two different directions.

8. The combination of claim 7 wherein the suspending means includes means for vertically adjusting the position of the pivotal axis on the frame to simultaneously change the inclination of the pan and stroke of movement imparted thereto.

* * * * *